US012560014B2

(12) United States Patent
Hirtsiefer et al.

(10) Patent No.: US 12,560,014 B2
(45) Date of Patent: Feb. 24, 2026

(54) CONTROL ARM FOR MOVABLE FURNITURE PARTS

(71) Applicant: Samet Kalip Ve Madeni Esya San Ve Tic. A.S., Istanbul (TR)

(72) Inventors: Artur Hirtsiefer, Neunkirchen-Seelscheid (DE); Nurettin Güzeltepe, Istanbul (TR); Izzet Yarar, Istanbul (TR)

(73) Assignee: Samet Kalip Ve Madeni Esya San Ve Tic. A.S., Istanbul (TR)

( * ) Notice: Subject to any disclaimer, the term of this patent is extended or adjusted under 35 U.S.C. 154(b) by 0 days.

(21) Appl. No.: 18/710,562

(22) PCT Filed: Dec. 6, 2021

(86) PCT No.: PCT/TR2021/051357
§ 371 (c)(1),
(2) Date: May 15, 2024

(87) PCT Pub. No.: WO2023/107015
PCT Pub. Date: Jun. 15, 2023

(65) Prior Publication Data

US 2025/0034926 A1 Jan. 30, 2025

(51) Int. Cl.
*E05F 1/08* (2006.01)
*E05F 1/10* (2006.01)
*E05F 1/14* (2006.01)

(52) U.S. Cl.
CPC .............. *E05F 1/1058* (2013.01); *E05F 1/14* (2013.01); *E05Y 2201/474* (2013.01); (Continued)

(58) Field of Classification Search
CPC ... E05F 1/08; E05F 1/10; E05F 1/1041; E05F 1/1058; E05F 1/1091; E05F 1/12; (Continued)

(56) References Cited

U.S. PATENT DOCUMENTS 3,204,287 A * 9/1965 Gronbach ............. E05F 1/1261 74/592
5,904,411 A * 5/1999 Hayakawa ............ E05D 15/582 49/386
(Continued)

FOREIGN PATENT DOCUMENTS

DE 3140039 A1 * 4/1983
DE 202014104301 U1 * 12/2015 ............. E05D 15/46
(Continued)

OTHER PUBLICATIONS

Russia Search Report for corresponding patent application No. 2024114705, filing date Dec. 6, 2021, 2 pages (not prior art).
(Continued)

*Primary Examiner* — Chuck Y Mah
(74) *Attorney, Agent, or Firm* — Lucian Wayne Beavers; Patterson Intellectual Property Law PC

(57) ABSTRACT

A control arm includes a first and a second arm section pivotably connected to each other. A control part is coupled to the first arm section and includes a control surface. A thrust piece is mounted on the second arm section and includes a counter control surface. At least one spring element biases the thrust piece relative to the control piece. The arm sections are pivoted relative to one another and the relative movement between the control part and the thrust piece is a rolling movement.

15 Claims, 3 Drawing Sheets

Figure 1:
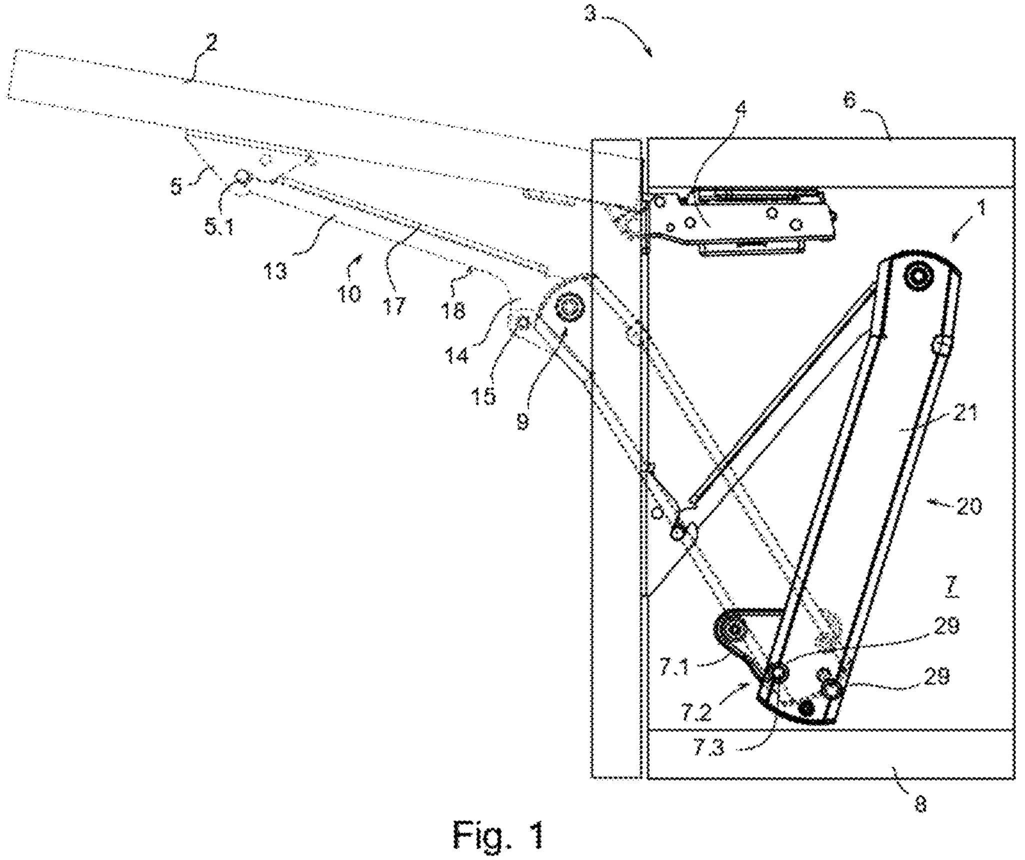

(52) U.S. Cl.
CPC ... *E05Y 2201/626* (2013.01); *E05Y 2800/268* (2013.01); *E05Y 2900/20* (2013.01)

(58) Field of Classification Search
CPC ..... E05F 1/1223; E05F 1/1246; E05F 1/1253; E05F 1/1261; E05F 1/1292; E05F 1/14; E05F 3/20; E05F 3/18; E05D 11/1021; E05D 3/12; E05D 3/14; E05D 3/16; E05D 11/10; E05D 15/40; E05D 15/401; E05D 15/405; E05D 15/406; E05D 15/42; E05D 15/58; E05D 15/565; E06B 3/5045; E05Y 2800/22; E05Y 2800/268; E05Y 2900/20; E05Y 2900/202; E05Y 2900/208; E05Y 2900/21; E05Y 2201/21; E05Y 2201/264; E05Y 2201/212; E05Y 2201/474; E05Y 2201/604; E05Y 2201/626
See application file for complete search history.

(56) References Cited

U.S. PATENT DOCUMENTS

| | | | | |
|---|---|---|---|---|
| 7,478,891 | B2 | 1/2009 | Hollenstein | |
| 8,096,455 | B2 * | 1/2012 | Viklund | B60R 9/055 224/328 |
| 8,177,445 | B2 * | 5/2012 | Jones | B41J 3/4071 16/293 |
| 8,894,162 | B2 * | 11/2014 | Kashiwaguma | E05F 1/1058 312/319.2 |
| 9,631,411 | B2 | 4/2017 | Lutz | |
| 9,909,346 | B2 * | 3/2018 | Holzapfel | E05D 15/401 |
| 10,711,498 | B2 | 7/2020 | Grewe et al. | |
| 2006/0174444 | A1 * | 8/2006 | Giovannetti | E05D 15/262 16/354 |
| 2006/0284530 | A1 | 12/2006 | Hollenstein | |
| 2015/0240546 | A1 | 8/2015 | Sugatsune et al. | |
| 2015/0351539 | A1 * | 12/2015 | Baldreich | E05F 1/1058 312/319.2 |
| 2016/0160551 | A1 * | 6/2016 | Lutz | E05D 11/1064 185/37 |
| 2016/0333620 | A1 * | 11/2016 | Holzapfel | E05F 1/1058 |
| 2016/0376823 | A1 * | 12/2016 | Huber | E05F 1/1058 312/319.2 |
| 2018/0016829 | A1 * | 1/2018 | Kaiser | E05F 1/1276 |
| 2020/0063484 | A1 * | 2/2020 | Haemmerle | E05F 3/20 |
| 2020/0224477 | A1 * | 7/2020 | Sobolewski | E05F 1/1075 |

FOREIGN PATENT DOCUMENTS

| | | | | |
|---|---|---|---|---|
| EP | 1148200 | A2 * | 10/2001 | E05D 11/1064 |
| EP | 2251514 | A1 | 11/2010 | |
| EP | 1713996 | B1 | 3/2014 | |
| EP | 3708753 | A1 | 9/2020 | |
| ES | 2892294 | T3 * | 2/2022 | E05F 1/1025 |
| RU | 2744234 | C1 | 3/2021 | |
| WO | WO-2007112800 | A1 * | 10/2007 | E05F 1/1058 |
| WO | 2015027251 | A1 | 3/2015 | |

OTHER PUBLICATIONS

International Search Report and Written Opinion for corresponding patent application No. PCT/TR2021/051357, dated Jul. 28, 2022, 12 pages (not prior art).

* cited by examiner

CONTROL ARM FOR MOVABLE FURNITURE PARTS

The invention relates to a control arm for movable furniture parts, which is adjustable between a closed and an open position, in particular to a flap holder for a furniture flap, with a first and a second arm section, wherein one arm section can be coupled to a movable furniture part and the other arm section can be coupled to a piece of furniture, wherein the first arm section and the second arm section are pivotably connected to each other, wherein a control part is coupled to the first arm section in an articulated manner, which control part has a control surface, wherein a thrust piece is mounted on the second arm section, which thrust piece has a counter control surface, wherein the control surface and the counter control surface are in contact, and wherein at least one spring element is provided which biases the thrust piece relative to the control piece.

From EP 1 713 996 B1, a control arm for flaps of cabinets is known which has a housing with an actuator unit for coupling to a side wall of a cabinet and an arm section for coupling to a flap. The arm section is hingedly connected to the actuator unit via an axis. A control part is articulatedly coupled to a lever arm of the arm section by means of an axis. Furthermore, the control part is linearly adjustable and rotatably mounted relative to the actuator unit by means of an axis. The control part has a control cam. During an opening or closing movement, the control part pivots about the axis on the lever arm of the actuator arm and about the axis, on the actuator arm drive. In the process, a force is exerted by the control cam on a thrust piece of the actuator unit. The thrust piece is preloaded by means of several compression springs. Since the control part is linearly adjustable and rotatably mounted relative to the actuator unit, a slip occurs between the control part and the thrust piece, which can be compensated by a height-adjustable metal plate mounted between the thrust piece and the control part.

The task of the invention is to provide a control arm that has a long service life and allows for low operating forces and a compact design.

The task of the invention is solved by providing that, when the arm sections are pivoted relative to one another, the relative movement between the control part and the thrust piece is a rolling movement.

In this context, a rolling motion is understood to mean in particular a rolling motion without slip or at least with negligible slip between the control part and the thrust piece.

If the relative movement between the control part and the thrust piece is a rolling movement, no sliding friction or at least only a low amount of sliding friction occurs between the thrust piece and the control part when the arm sections, are pivoted. Thus, the required operating forces and/or the required travel distances for actuating the control arm can be reduced.

This also reduces wear on the thrust piece and the control part. The overall reduced operating forces for actuating the control arm also result in a reduced load on other components of the control arm. This means that the service life of the control arm can be extended.

In particular, the relative movement between the control part and the thrust piece can be such that the control part rolls directly on the thrust piece or vice versa. In this way, a reduced number of parts is required and a compact design of the control arm is achieved.

If it is provided that the arm section which can be coupled to the piece of furniture has a control arm bearing for pivotable coupling to the piece of furniture, the control arm is particularly suitable for use as a flap holder for a furniture flap.

Preferably, it can be provided that the control surface and/or the counter control surface is/are curved at least in regions.

In this way, an improved rolling of control part and thrust piece results. Furthermore, by means of the design of the curvature of the control surface and/or the counter control surface, influence can be taken on the dependence of the pretensioning force of the spring element on the pivoting movement of the two arm sections relative to each other. In particular, the position of any dead points of the pretensioning force with respect to the pivoting movement can be specifically designed. Also, in this way, the desired pretensioning forces during the pivoting movement can be specifically set as a function of the pivoting angle by means of the design of the curvature. For example, the desired holding forces in an open position and in a closed position can be designed independently of each other.

In this context, a curved surface means not only a smooth curved surface, but also a structured curved surface. In particular, the structure may be superimposed on the curvature. For example, the camber of a tip circle, root circle or pitch circle of a spur gear is also understood to be the curvature of the peripheral surface of the spur gear.

Particularly preferably, it may further be provided that the control surface and/or the counter control surface is/are convexly curved.

According to a preferred embodiment, it is provided that, when the arm sections pivot relative to one another, the position of the instant center of the relative movement between control part and thrust piece changes with respect to the thrust piece and/or the control part. It is particularly preferred that the position of the instant center shifts along the control surface and/or the counter-control surface at least in regions.

The displacement of the instant center may be achieved, for example, by generating the rolling motion at least in part by a pivoting movement of the control part and/or the thrust piece. For this purpose, the control part and/or the thrust piece may be pivotably mounted, for example on the associated arm section.

If it is provided that the control element, preferably the control surface has a positive-locking element and the thrust piece, preferably the counter control surface has a counter positive-locking element, and that during the rolling movement the positive locking element engages with the counter positive locking element to form a positive-locking connection, there is a clear assignment of the position of the control part to the thrust piece during the rolling movement. Control part and thrust piece are thus reliably guided against each other.

Preferably, the positive-locking connection here acts at least partially in and/or transversely to the rolling direction. In this way, it can be prevented even more reliably that the position of the control part changes unintentionally with respect to the thrust piece. An unintentional change in position can occur, for example, during a jerky actuation of the control arm.

In this context, it can be provided in particular that the control surface has a toothing and the counter control surface has a counter toothing, wherein the toothing and the counter toothing engage in each other. In this way, a reliable transmission of force between the thrust piece and the control piece can be ensured during the rolling movement.

Preferably, it can be provided that in the closed position the force exerted by the at least one spring element on the thrust piece is lower than the maximum force exerted during the pivoting of the arm sections relative to each other. Thus, the control arm can be held securely in the closed position.

For example, it is conceivable that the at least one spring element is a compression spring, which is loaded or deflected to a lesser extent in the closed position than during at least parts of the pivoting movement.

According to a preferred variant of the invention, it can be provided that one or more detent positions are provided on the control part and/or on the thrust piece.

For example, the detent positions can be provided in a positive-locking manner, for example in the form of detent elements on control part and/or thrust piece, which engage in a detent receptacle on the respective other part for detenting. However, it is also conceivable that the shape, for example the curvature, of the control part and/or the thrust piece is designed in such a way that it can remain in selected detent positions. Thus, it is conceivable that the force exerted by the at least one spring element on the pressure piece reaches a local minimum not only at an end position, but also at a detent position.

In this way, it is possible for the control arm to be held securely not only in the open and closed positions, but also in intermediate positions. For example, it is conceivable, particularly in connection with use as a flap holder, that the user may wish to open a flap only partially because, for example, a drawer or flap arranged above or next to it is open. In this case, corresponding detent positions facilitate access to the interior of the furniture and prevent collisions of the movable furniture part with other furniture parts.

Particularly preferably, the one or more detent positions may be provided on the control surface and/or on the counter control surface.

A preferred embodiment is such that the lines of action of the force exerted by the thrust piece on the control part and the force exerted by the first arm section on the control member are substantially collinear.

In this way, the control part remains free of external torque. Accordingly, this results in a stress-optimized design of the force transmission between the components of the control arm. Also, this arrangement naturally aligns the control part at least largely along the force to be transmitted. Consequently, with such a design, an additional guide of the control part can be omitted, or such an additional guide must at least absorb only small forces and can thus be dimensioned smaller. This reduces the number of parts and the assembly costs of the control arm.

If it is provided that the second arm section has a housing that forms a receiving space, this results in a compact structure and an attractive visual appearance of the control arm. For example, mechanical components of the control arm can be accommodated in the receiving space. They are thus also protected from unwanted access, which increases safety for the user.

In particular, it can be provided that the housing is formed from two housing halves. This facilitates the manufacture and assembly of the housing.

According to the invention, it can be provided that the housing has at least one guide, in particular a guide groove, on at least one housing wall, and that the control part has at least one guide projection which is guided in the at least one guide.

The guide can securely guide the control part relative to the housing. In particular, this prevents the control part from unintentionally changing its position, as could happen, for example, due to jerky actuation or external forces.

It may also be provided that the spring element is received in the receiving space of the housing, in particular that the spring element is supported in an end region of the housing. The spring element can thus be supported in a secure and mechanically stable manner. In addition, it is effectively prevented that a user unintentionally comes into contact with the spring element or gets caught in it, for example, with pieces of clothing or hair.

According to a preferred embodiment, it can be provided that the housing has at least one guide area on at least one housing wall and/or at least one counter-sliding surface, in that the thrust piece has at least one guide surface and/or at least one sliding surface, and in that the thrust piece is guided by means of the at least one guide surface on the at least one guide region and/or by means of the at least one sliding surface on the at least one counter sliding surface, preferably in a linearly displaceable manner.

In this way, the thrust piece is securely guided on the housing.

Particularly preferably, the guide area can be a curved guide area and/or the guide surface can be a curved guide surface, so that transverse forces can also be reliably absorbed via the guide area and/or the guide surface.

Preferably, according to a variant of the invention, it can be provided that the first arm section has a stop surface and/or a contact surface, that the control part has a stop and/or a counter contact surface, and that in the open position the stop surface is supported relative to the stop and/or in the closed position the contact surface is supported relative to the counter contact surface.

In this way, the first arm section is held securely in the end position or in the end positions. When the stop surface and/or the contact surface are provided on the first arm section and the stop and/or the counter contact surface are provided on the control part, the need to provide stops, for example on the housing, is eliminated. On the one hand, this reduces the parts and assembly costs.

On the other hand, for example, the housing does not have to bear, or at least only has to partially bear, the forces exerted by the first arm section on a stop in an open or closed end position. In fact, according to this variant of the invention, parts can be used for this purpose that are designed to be load-bearing anyway, i.e. the control part and the first arm section.

If it is provided that the first arm section has a control lever to which the control part is coupled in an articulated manner, a particularly favorable transmission of force between the first arm section and the control part can be achieved.

According to one embodiment, it can also be provided that the at least one spring element is supported relative to a spring bearing, that a preloading element cooperates with the spring bearing to form an adjustment mechanism, the preloading element being adjustable with respect to the spring bearing, and that the preload of the spring element is adjustable with the adjustment mechanism.

This results in a structurally simple and stable solution for making the preload force of the spring element adjustable.

Figure 2:
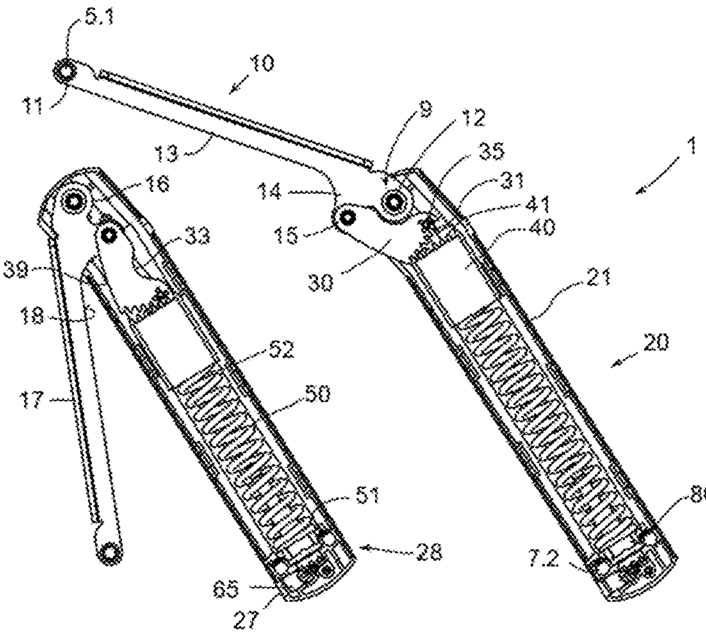
Figure 3:
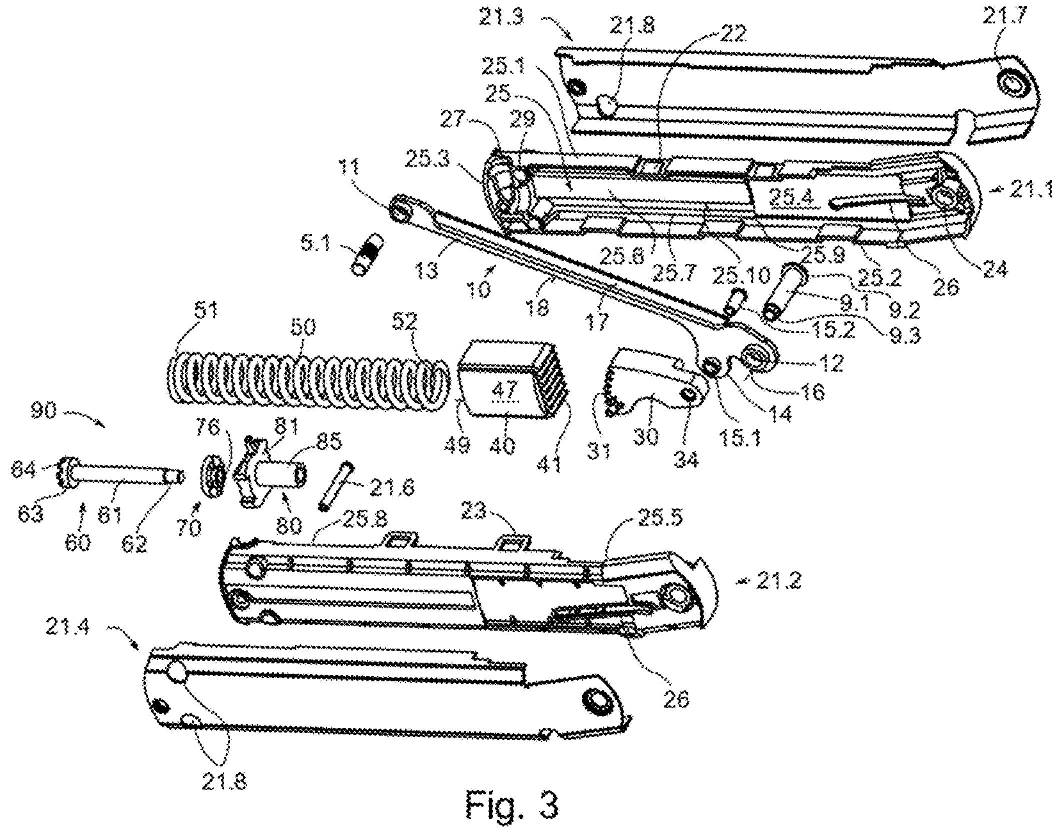
Figure 4:
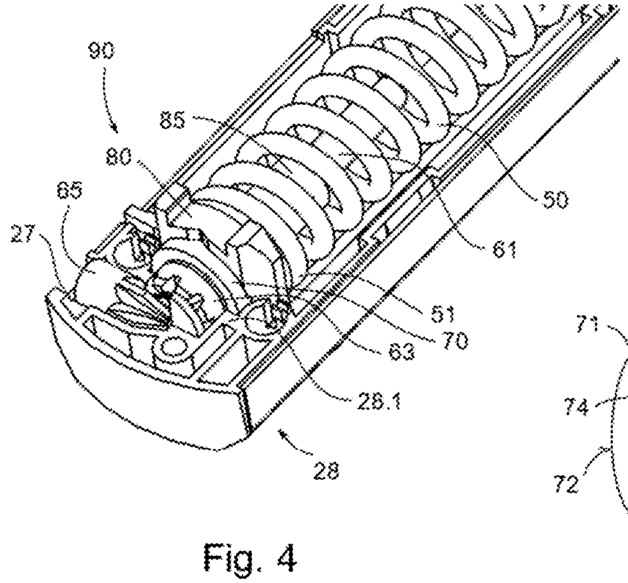
Figure 5:
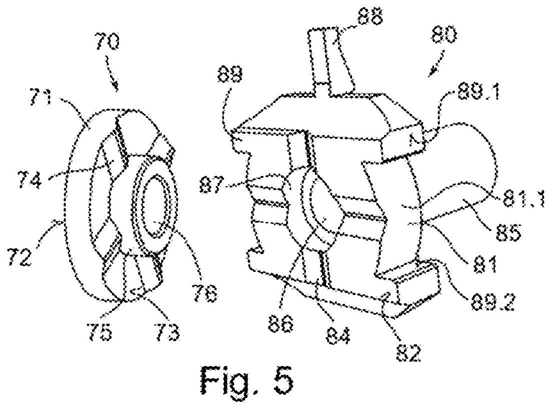
Figure 6:
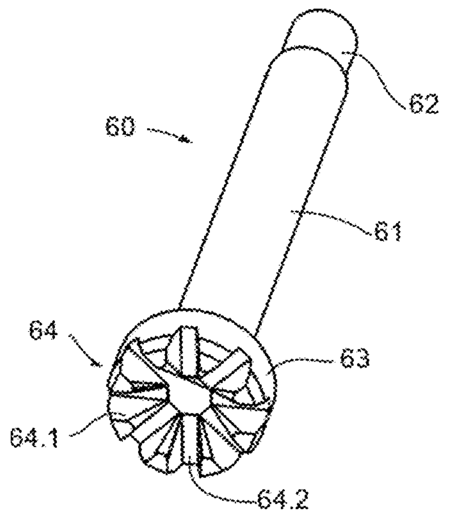
Figure 7:
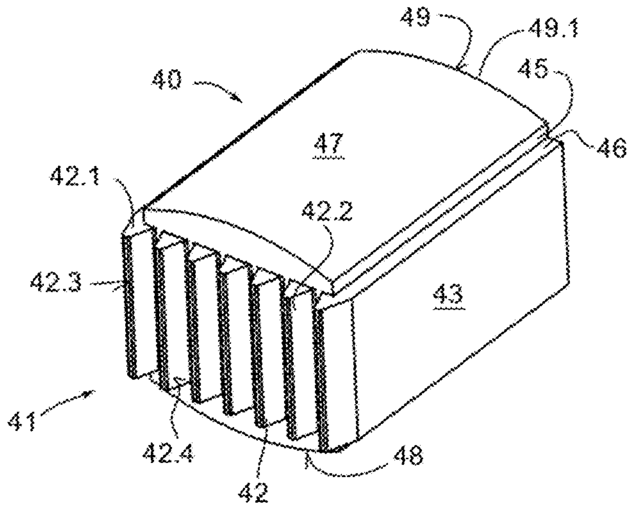
Figure 8:
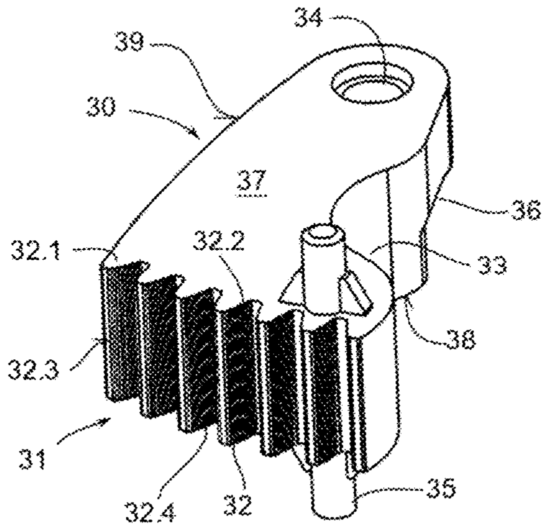

The invention is explained in more detail below with reference to an example of an embodiment shown in the drawings, of which show:

FIG. 1 a piece of furniture 3 with a hinged flap 2 and a control arm 1, FIG. 2 the control arm 1 in a closed and in an open position, FIG. 3 the control arm 1 in an exploded view, FIG. 4 an end region 28 of a second arm section 20 of the control arm 1, FIG. 5 a coupling body 70 and a spring bearing 80 of an adjustment mechanism 90, FIG. 6 a preloading element 60 of the adjustment mechanism 90, FIG. 7 a thrust piece 40 of the control arm 1 and FIG. 8 a control part 30 of the control arm 1.

FIG. 1 shows a piece of furniture 3 with a hinged flap 2 and a control arm 1. Solid lines show a closed position, dashed lines show an open position. As shown, the piece of furniture 3 may be a cabinet with a cabinet lid 6, a cabinet bottom 8 and a side wall 7. The flap 2 may be hinged to the cabinet lid 6 by means of a furniture hinge 4 such that it can be pivoted about a horizontal axis. A flap bearing 5 may be attached to the flap 2 at a distance from the pivot axis of the furniture hinge 4. The control arm 1 may be coupled to the flap bearing 5 in an articulated manner.

As can be further seen from FIG. 1, the control arm 1 has a first arm section 10 and a second arm section 20 which are pivotally connected to each other. As shown, the first arm section 10 and the second arm section 20 may be connected to each other by means of a pivot bearing 9.

In the embodiment shown, the first arm section 10 is connected to the flap 2 of the furniture 3 by means of the flap bearing 5. For this purpose, for example, a flap bearing receptacle 11 may be provided on the first arm section 10 at its end region facing away from the pivot bearing 9, which may be in the form of a bore which accommodates a flap bearing pin 5.1, as can be seen, for example, in FIG. 3.

The second arm section 20 may be pivotably connected to a side wall 7 of the piece of furniture 3. For this purpose, a control arm bearing 7.2 may be provided on the second arm section 20 in the area of its end facing away from the pivot bearing 9. The control arm bearing 7.2 may be formed as a passage 29 which accommodates, for example, a bearing pin 7.3. Presently, a mounting plate 7.1 is attached to the side wall 7 of the piece of furniture 3, which carries the bearing pin 7.3.

Deviating from the example shown in FIG. 1, the first arm section 10 may of course also be connected to the piece of furniture 3 and the second arm section 20 may be coupled to the movable furniture part or flap 2.

As can be further seen from FIG. 1, during an opening or closing movement of the flap 2 relative to the furniture 3, the first arm section 10 and the second arm section 20 are pivoted relative to each other, for example about the pivot bearing 9. The first arm section 10 and the second arm section 20 can consequently be pivoted relative to each other between an opening position and a closing position.

It is also conceivable to use the control arm 1 with other kinds of furniture 3. In particular, the movable furniture part 2 may also be pivotable about a differently oriented axis, for example a vertical axis, as is usually the case with doors, for example. Furthermore, it is conceivable that only one of the arm sections 10, 20 is pivotably mounted on the respective associated piece of furniture 3 or movable furniture part 2. Furthermore, arrangements are also conceivable in which no further pivot axis is provided in addition to the axis formed by the pivot bearing 9, for example if no furniture hinge 4 is used.

As in the embodiment shown in the figures, the second arm section 20 may comprise a housing 21 which forms a receiving space 25. The housing 21 may be divided into two housing halves 21.1, 21.2, as can be seen, for example, in FIG. 3.

FIG. 2 shows the control arm 1 in a closed position and in an open position, with the housing 21 displayed open. In other words, one of the housing halves 21.1, 21.2 is not shown in FIG. 2.

FIG. 2 shows that the first arm section 10 may be formed by an elongate portion 13 on which a reinforcement 17, for example in the form of a bend, may be provided. In the area of the flap bearing 5, the first arm section 10 may have a flap bearing receptacle 11, which may be in the form of a bore, as in the embodiment shown. The flap bearing receptacle 11 may, for example, receive the flap bearing pin 5.1 to form the flap bearing 5.

In the area of the end of the first arm section 10 opposite the flap bearing 5, a pivot bearing receptacle 12 may be provided on the arm section 10. As can be seen from the figures, the pivot bearing receptacle 12 may be designed as a bore which serves to receive a pivot bearing pin 9.1.

As can be further seen in FIG. 2, a control part 30 is hingedly coupled to the first arm section 10. Furthermore, a control lever 14 may be provided in the area of the end of the first arm section 10 facing the pivot bearing 9. As in the present case, the control part 30 may be coupled to the control lever 14. The control lever 14 may be integrally formed on the elongate portion 13, as can be seen from FIG. 2. However, it is also conceivable that the control lever 14 is attached to the first arm section 10 in other ways, for example by releasable or non-releasable connections such as screwing, riveting or gluing.

The control part 30 may be connected to the first arm section 10 via a control bearing 15. As in the embodiment example shown in the figures, the control bearing 15 may be provided on the control lever 14 of the first arm section 10. However, it would also be conceivable to provide the control bearing 15, for example, directly on the elongate portion 13 of the first arm section 10 or at another location. The control bearing 15 may, for example, be provided as a control bearing bore 15.1 which receives a control bearing pin 15.2 to form the control bearing 15.

The first arm section 10 may further comprise a contact surface 18. For example, the contact surface 18 may be arranged on a surface of the elongate portion 13 facing the control part 30 in the closed position. Accordingly, the contact surface 18 may be provided on the side of the elongate portion 13 opposite the reinforcement 17. However, it is also conceivable to provide the reinforcement 17 on the side facing the control part 30 in the closed position or on any side of the first arm section 10. Accordingly, the contact surface 18 may also be provided on the reinforcement 17.

Furthermore, the first arm section 10 may have a stop surface 16, which, for example, may be arranged on a surface of the elongate portion 13 facing the control part 30 in the closed position in the area in proximity of the pivot bearing 9.

A possible design variant of the control part 30 is shown in more detail in FIG. 8. The control part 30 may, for example, have a control bearing receptacle 34 which receives a control bearing pin 15.2. As in the present case, for example, the control bearing receptacle 34 may be designed as a bore. The control bearing receptacle 34, the control bearing pin 15.2 and the control bearing bore 15.1 of the first arm section 10 may thus form the control bearing 15.

The control part 30 may further comprise a recess 36. As can be seen in FIG. 8, the recess 36 may be provided in an underside 38 of the control part 30 in the area of the control bearing receptacle 34. By means of the recess 36, the control part 30 may be connected to the first arm section 10 in a space-saving manner. For example, the control lever 14 of the first arm section 10 may be receivable in the recess 36. However, it is also conceivable to provide a recess 36 not on an underside 38, but on an upper side 37 of the control part 30. A recess 36 may also be provided, for example, between the upper side 37 and the underside 38 of the control part 30, so that a fork-like receptacle is formed in which the first arm section 10 or the control lever 14 can be received.

As can be further seen in FIG. 8, the control part 30 has a control surface 31. This may be provided, for example, on a side of the control part 30 facing away from the control bearing 15 or the control bearing receptacle 34. The control surface 31 may have any desired curvature, in the present case it is convexly curved. Furthermore, the control surface 31 may comprise one or more positive-locking elements 32. As in the shown embodiment, a toothing 32.1 with teeth 32.2 is provided at the control surface 31, which teeth have tooth flanks 32.4 and head surfaces 32.3. The teeth 32.2 form the positive locking elements 32. The toothing 32.1 may be superimposed on the curvature of the control surface 31. The toothing 32.1 may be straight toothing, but other types of toothing such as helical toothing are also conceivable. The head surfaces 32.3 and/or the tooth flanks 32.4 may also be curved or flat.

A counter contact surface 39 may further be provided on the control portion 30. For example, the counter contact surface 39 may be provided on a side surface of the control part 30. A stop 33 may also be provided on the control part 30, which may be formed by a contoured recess in the side of the control part 30 opposite the counter contact surface 39.

As can be seen from FIG. 8, the control part 30 may have one or more guide projections 35. For example, a guide projection 35 may be arranged on the upper side 37 and/or on the underside 38 of the control part 30 at a distance from the control bearing receptacle 34. The guide projections 35 may be formed as pin-shaped projections, which may be further reinforced by means of ribs or other types of reinforcing elements. The guide projections 35 may, for example, be integrally formed on the control part 30.

FIG. 7 shows a possible design of the thrust piece 40. The thrust piece 40 has a counter control surface 41. In the present case, the counter control surface 41 has no curvature, but it may have a curvature. Furthermore, the counter control surface 41 may comprise one or more counter positive-locking elements 42. As in the embodiment shown, a mating counter toothing 42.1 may be provided on the counter control surface 41 with teeth 42.2 having tooth flanks 42.4 and head surfaces 42.3. The teeth 42.2 form the counter positive locking elements 42. The counter-toothing 42.1 may be superimposed on the curvature of the counter-control surface 41. The counter toothing 42.1 may be a straight toothing, but other types of toothing such as helical toothing are also conceivable. Also, the head surfaces 42.3 and/or the tooth flanks 42.4 may be curved or flat.

The thrust piece 40 may further comprise a back surface 49. For example, the back surface 49 may be provided on the side of the thrust piece 40 opposite the counter control surface 41. A spring receptacle 49.1 may be arranged at the back surface 49. It is conceivable that the spring receptacle 49.1 is formed directly by the back surface 49. However, it is also conceivable that the spring receptacle 49.1 is provided as a hole, for example a blind hole, or as a projection, for example a stud on the back surface 49 or elsewhere on the thrust piece 40.

The thrust piece 40 may further comprise a guide surface 47 and an opposite lower surface 48, which may extend from the counter control surface 41 to the back surface 49. As can be seen from FIG. 7, the guide surface 47 and the lower surface 48 may have the same design. However, it is also conceivable to provide different designs. In the present case, guide surface 47 and lower surface 48 are convexly curved.

Furthermore, the thrust piece 40 may have side surfaces 43 that lead, for example, from the counter control surface 41 to the back surface 49 and from the guide surface 47 to the lower surface 48. Presently, the side surfaces 43 are designed to be flat, but they may also have a curvature.

Sliding surfaces 45, 46 may also be provided on the thrust piece 40. In the present case, the sliding surfaces 45, 46 are formed as flat, offset surfaces that are angled to the guide surface 47 and the lower surface 48 or to the side surfaces 43. Thus, the illustrated embodiment of the thrust piece 40 has eight sliding surfaces 45, 46. However, it is conceivable to provide a larger or smaller number of sliding surfaces 45, 46.

As can be seen from FIG. 2, the thrust piece 40 is mounted on the second arm section 20. It may, for example, be mounted so as to be displaceable relative to the second arm section 20. The control surface 31 of the control part 30 is in contact with the counter control surface 41 of the pressure piece 40.

As can further be seen in FIG. 2, a spring element 50 is also provided which pretensions the thrust piece 40 relative to the control part 30. The spring element 50 shown is designed as a compression spring, but other types of springs are also conceivable, such as tension springs, disc springs, leaf springs or spiral springs. The spring element 50 may have a first spring end 51 and an opposite second spring end 52.

The second spring end 52 may be supported on the back surface 49 of the thrust piece 40, in this case on the spring receptacle 49.1. The first spring end 51 may, for example, be supported on the second arm section 20. In the present case, the first spring end 51 is supported relative to a spring bearing 80, which may be arranged in an end region 28 of the second arm section 20.

A possible design of the housing 21 is explained in more detail below with reference to FIG. 3. As can be seen from this illustration, the housing 21 may have two housing halves 21.1, 21.2. The housing 21 may have a receiving space 25 which may be surrounded by housing walls 25.1, 25.2, 25.3, 25.4.

The housing 21 may have passages 29 in its end region 28. For example, two passages 29 may be provided, wherein one passage 29 may serve to receive the bearing pin 7.3 and thus to form the control arm bearing 7.2. Furthermore, a pivot bearing bore 24 may be provided in a region of the housing 21 facing away from the end region 28. As in the present case, the pivot bearing bore 24 may serve to receive the pivot bearing pin 9.1 and thus to form the pivot bearing 9.

A guide 26 may be provided in one housing wall 25.4 or in several housing walls, which may be designed as a guide groove or a guide slot. A guide is for example provided in both housing halves 21.1, 21.2. However, it is also conceivable to provide a guide in only one housing half to form the guide 26. The guide projection 35 or the guide projections 35 of the control part 30 may be guided in the guide 26.

Furthermore, the housing 21 may have a guide region 25.6 on a housing wall 25.4. The guide region 25.6 is designed as a surface with a concave curvature. The guide region 25.6 may guide the guide surface 47 of the thrust piece 40.

In addition, counter sliding surfaces 25.7, 25.9 may be provided on the housing 21. These are designed to correspond to the sliding surfaces 45, 46 of the thrust piece 40. The sliding surfaces 45, 46 of the thrust piece 40 may be guided on the counter sliding surfaces 25.7, 25.9 of the housing 21.

The housing 21 may be formed by two housing halves 21.1, 21.2, which may be symmetrical to each other in their essential components. In the embodiment shown, the housing halves 21.1, 21.2 differ in that latching elements 22 may be arranged on one housing half 21.1 and counter latching elements 23 may be arranged on the other housing half 21.2. The latching elements 22 may, for example, be designed as latching lugs and the counter latching elements 23 as corresponding tabs.

The housing 21 may also have a housing opening 25.5, which may, for example, be provided as a recess in the housing wall 25.1 of both housing halves 21.1, 21.2 in an area directly or indirectly adjoining the pivot bearing bore 24. The housing opening 25.5 allows the first arm section 10 and the control part 30 to pass through the housing 21.

A further opening of the housing 21 may be provided by a guide slot 25.8, which may also be provided as a recess in the housing wall 25.1 of both housing halves 21.1, 21.2. The guide slot 25.8 may connect indirectly or directly to the end region 28 of the housing 21. The guide slot 25.8 may serve to guide a guide lug 88 of the spring bearing 80.

Furthermore, the housing 21 may have a tool opening 27, which may be designed as a hole in the housing wall 25.1, preferably at the end region 28 of the housing 21.

As can be seen from FIG. 3, covers 21.3, 21.4 may be provided on the housing halves 21.1, 21.2. In the present case, the covers 21.3, 21.4 are designed in such a way that they at least largely cover the housing halves 21.1, 21.2. However, components of the housing half 21.1 that are essential for the function and assembly, such as housing opening 25.5, guide slot 25.8, pivot bearing bore 24, passages 29 and/or tool opening 27, may be left completely or partially free and accessible.

In FIG. 4, an end region 28 of an embodiment of the second arm section 20 is shown in more detail. As previously mentioned, the spring element 50 may be supported on a spring bearing 80. The spring bearing 80 may be part of an adjustment mechanism 90, by means of which the preload of the spring element 50 can be adjusted. As can be further seen in FIG. 4, the adjustment mechanism 90 may comprise a preloading element 60, a coupling body 70 and the spring bearing 80.

A possible embodiment of the preloading element 60 is shown in more detail in FIG. 6. The preloading element 60 may have a threaded section 61 that is cylindrical, for example. The threaded section 61 may be adjoined on one side by a extension 62. In the present case, the extension 62 has a smaller diameter than the threaded section 61 and does not have a thread. The extension 62 may, for example, be integrally formed on the threaded section 61 or be detachably or non-detachably connected thereto, for example by means of a screw or adhesive connection.

Furthermore, a head 63 of the preloading element 60 may be indirectly or directly connected to the threaded section 61. The head 63 may for example be cylindrically shaped and have a larger diameter than the threaded section 61. Furthermore, the head 63 may be arranged opposite the extension 62. The head 63 may have an engagement structure 64, which may, as shown in FIG. 6, be formed by protrusions 64.1 and depressions 64.2 arranged in succession in the circumferential direction. The engagement structure 64 may preferably be designed to enable positive transmission of force between a tool 65 and the preloading element 60. In the present case, the engagement structure 64 is configured such that a tool 65 in the form of a screwdriver or a screw bit with a cross-slotted contour may engage therein, as can be clearly seen in FIG. 4. However, other configurations of the engagement structure 64 are also conceivable. Furthermore, it is conceivable that the force transmission between a tool 65 and the preloading element 60 is not or only partially positive. In this case, the force transmission may, for example, be partially or completely non-positive and thus partially of completely frictional. In such a design, the engagement structure 64 may be dispensed with, for example.

FIG. 5 shows in more detail possible designs of the coupling body 70 and the spring bearing 80.

The coupling body 70 may be cylindrical; it is shown here as a disk body 71. The coupling body 70 may have a largely flat rear side 72. Opposite the disk rear side 72 may be arranged a disk front side 73. As in the embodiment shown, a centering shoulder 75 may be provided on the coupling body 70, which may be cylindrical and may have a smaller outer diameter than the disc body 71.

Furthermore, the coupling body 70 may be penetrated by a screw receptacle 76, which may be designed as a through-hole with an internal thread.

Coupling elements 74 may be provided on the front side 73 of the disc, for example in the form of elevations 74 protruding above the front side 73 of the disk and extending radially from the outer circumference of the disk body 71 to the centering projection 75. However, other designs of the elevations 74 are also conceivable. For example, they do not have to run radially. It would also be conceivable to provide only one elevation 74 on the coupling body 70. It would also be possible to arrange them not on the front side 73 of the disc but, for example, on the centering projection 75.

As can be further seen from FIG. 5, the spring bearing 80 may have a base body 81, which may be disc-shaped and have a front side 82. Opposite the front side 82, the base body 81 may be adjoined by a guide projection 85, which may be cylindrical. The base body 81 may also have a spring bearing sliding surface 81.1, which may be designed as a curved outer surface of the base body 81.

Furthermore, FIG. 5 shows that the spring bearing 80 may be penetrated by a receiving bore 86. The receiving bore 86 may be designed as a cylindrical through bore and without thread. In the region of the front side 82 of the base body 81, the receiving bore 86 may furthermore be surrounded by a centering receptacle 87. Conceivably, the centering receptacle 87 may be a cylindrical recess with an enlarged diameter compared to the receiving bore 86.

Counter-coupling elements 84, for example in the form of recesses 84 may be arranged on the front side 82 of the base body 81. Preferably, recesses 84 are formed to correspond to the elevation 74 or elevations 74 on the front side 73 of the coupling body 70.

There may be further projections 89 provided on the base body 81 of the spring bearing 80. The projections 89 may have guide surfaces 89.1, 89.2. In the present case, guide surfaces 89.1, 89.2 are arranged at an angle to one another.

FIG. 4 shows the end region 28 of the second arm section 20 with the adjustment mechanism 90, wherein the bias of the spring element 50 is in a minimum adjustment state. As can be seen from FIG. 4, the head 63 of the preloading element 60 may be received rotatably in a receptacle 28.1 of the housing 21. For example, the receptacle 28.1 may be a cylindrical recess.

The coupling body 70 may have its disc rear side 72 in contact with the head 63 of the preloading element 60, with the threaded portion 61 of the preloading element 60 received in the threaded receptacle 76 of the coupling body 70. In other words, the coupling body 70 may be screwed onto the preloading element 60.

As can be seen in FIG. 4, the disc front side 73 of the coupling body 70 may rest against the front side 82 of the spring bearing 80. For example, the elevations 74 of the coupling body 70 may engage in the recesses 84 of the spring bearing 80. Furthermore, the centering projection 75 of the coupling body 70 may be received in the receiving bore 86 of the spring bearing 80.

The spring element 50 may now bear against the spring bearing 80 on the side opposite the front side 82 of the spring bearing 80, as shown in FIG. 4. The threaded section 61 of the preloading element 60 may pass through the coupling body 70 and the spring bearing 80 as shown in FIG. 4. The guide projection 85 of the spring bearing 80 and the threaded section 61 and the extension 62 of the preloading element 60 may be located inside the spring element 50 as shown in FIG. 4.

To mount the control arm 1, for example, the cover 21.3 may first be placed on the housing half 21.1. The pivot bearing pin 9.1 may then be guided through the orifice 21.7 of the cover 21.3 corresponding to the pivot bearing bore 24 and through the pivot bearing bore 24. To fix the pivot bearing pin 9.1, it may be provided that the latter has a pin head 9.2 which bears against the orifice 21.7.

Subsequently, the first arm section 10 may be assembled with the control part 30 to form a unit by means of the control bearing pin 15.2 guided through the control bearing bore 15.1 of the first arm section 10 and the control bearing receptacle 34 of the control part 30. This assembly may then be fitted onto the pivot bearing pin 9.1 with the pivot bearing receptacle 12. Furthermore, the guide projection 35 of the control part 30 may be inserted into the guide 26 of the housing 21.

In the following, the coupling body 70 may be screwed onto the preloading element 60. Thereafter, the spring bearing 80 may be fitted with its receiving bore 86 onto the threaded section 61 and brought into contact with its front side 82 with the disc front side 73 of the coupling body 70. Thus, the adjustment mechanism 90 is assembled.

Now the assembled adjustment mechanism 90 may be inserted into the receiving space 25 of the housing 21 by inserting the head 63 of the preloading element 60 into the receptacle 28.1 of the housing 21. Here, the spring bearing sliding surface 81.1 of the spring bearing 80 may be placed against the guide region 25.6 of the housing 21. Furthermore, the guide surfaces 89.1 may be brought into contact with the housing wall 25.4 and the guide surfaces 89.2 may be brought into contact with the spring bearing counter surface 25.10.

The spring element 50 may then be slid onto the adjustment mechanism 90 so that its first spring end 51 comes into contact with the spring bearing 80.

Now the thrust piece 40 may be inserted, whereby the thrust piece 40 is brought into contact with the second spring end 52 of the spring element 50 with its back surface 49 or its spring receptacle 49.1.

After insertion, the thrust piece 40 may rest with its guide surface 47 against the guide region 25.6 of the housing 21. Furthermore, it may rest with its sliding surface 45 against the counter sliding surface 25.7 and with its sliding surface 46 against the counter sliding surface 25.9 of the housing 21.

After the control part 30 has been brought with its control surface 31 into contact with the counter control surface 41 of the thrust piece 40, the second housing half 21.2 may be assembled with the first housing half 21.1. If it is provided that the pivot bearing pin 9.1 has a pin screw receptacle 9.3 at its end opposite from the pin head 9.2, a screw may then be used, for example, to secure the cover 21.4 and the second housing half 21.2 to the first housing half 21.1. A similar connection technique is conceivable for use with the passages 29 of the housing 21. Further, a retaining bolt 21.6 may be provided to connect the covers 21.4, 21.3 and the housing halves 21.1, 21.2.

The control arm 1 may now be mounted on a piece of furniture 3 with a movable furniture part, for example a flap 2, for use with the furniture 3. For this purpose, a mounting plate 7.1 may be mounted on a side wall 7 of the furniture 3, for example, which carries a bearing pin 7.3. The control arm 1 may then be slid onto the bearing pin 7.3 by means of one of the passages 29 to form the control arm bearing 7.2. The connection to the movable furniture part may be made, for example, by mounting a flap bearing 5 on the movable furniture part or flap 2. The first arm section 10 of the control arm 1 may then be connected to the flap bearing 5 by means of the flap bearing pin 5.1, which is guided through the flap bearing receptacle 11.

In the following, the operation of the control arm 1 is explained in more detail with reference to FIG. 2.

As can be seen in FIG. 2, the control part 30 rests with its control surface 31 against the counter control surface 41 of the thrust piece 40. Here, the thrust piece 40 is biased against the control part 30 by means of the spring element 50.

When the control arm 1 is transferred from an open position, as shown on the right in FIG. 2, to a closed position, as shown on the left in FIG. 2, the first arm section 10 pivots relative to the second arm section 20, in this case about the pivot bearing 9.

When the first arm section 10 pivots relative to the second arm section 20, the control part 30 rolls with its control surface 31 on the counter control surface 41 of the thrust piece 40. In the present case, the control part 30 is coupled in an articulated manner to the control lever 14 of the first arm section 10 by means of the control bearing 15, as a result of which the pivoting movement of the first arm section 10 is transmitted to the control part 30.

In the open position, the preload of the spring element 50 is transmitted to the first arm section 10 via the thrust piece 40 and the control part 30. The first arm section 10 may, as in the present case, rest with its stop surface 16 against the stop 33 of the control part 30, where it is held by the preload.

At the beginning of the pivoting movement starting from the closed position, the thrust piece 40 is displaced by the control part 30 on the second arm section 20 against the pretension of the spring element 50. In the present case, the preload of the spring element 50 is initially increased.

The design of the control surface 31 and the counter control surface 41 may be used to selectively adjust the characteristics of the displacement of the control part 30 depending on the pivot angle. Thus, the course of the preload of the spring element 50 can also be specifically modified. In the present case, the control surface 31 is convexly curved and the counter control surface 41 is flat.

In the embodiment shown, the toothing 32.1 of the control surface 31 meshes with the counter toothing 42.1 of the thrust piece 40 during the rolling motion.

When the control surface 31 rolls on the counter control surface 41 during the closing movement, the preload is initially increased starting from the open position. As can be seen from FIG. 2, the design of the control surface 31 and/or the counter control surface 41 may be such that shortly before the closed position is reached, a dead center is passed over at which the dependence of the preload of the spring element 50 on the angle of the pivoting is reversed and/or at which a local minimum of the preload is reached. The desired preload of the spring element 50 in the open and closed position may thus be designed independently of each other via the design of the control surface 31 and/or the counter control surface 41.

However, it is also conceivable that no dead center is provided, or that dead centers are provided at any other position of the closing movement, for example at the closed position.

During the rolling of the control part 30 and the thrust piece 40, no slip or at least only negligible slip occurs between the control surface 31 and the counter control surface 41. The instant center of the relative movement between control part 30 and thrust piece 40 may move along control surface 31 and/or counter-control surface 41 during the rolling movement.

In this case, the force exerted by the thrust piece 40 on the control part 30 has substantially the same direction as the force exerted by the first arm section 10 on the control part 30. The lines of action are thus essentially collinear.

In the present case, the thrust piece 40 is guided with its guide surface 47 on the guide region 25.6 of the housing 21 with its sliding surface 45 on the counter sliding surface 25.7 and with its sliding surface 46 on the counter sliding surface 25.9 of the housing 21. In particular, the counter sliding surfaces 25.7 may absorb forces acting on the thrust piece 40 transversely to the direction of the pretension of the spring element 50.

In the embodiment shown, in the closed position, the first arm section 10 rests with its contact surface 18 against the housing wall 25.1. However, it is also conceivable that the contact surface 18 in the closed position comes into contact, for example, with the counter contact surface 39 of the control part 30. In both ways, the control arm 1 is held securely in its closed position. In the example shown, the first arm section 10 rests with the contact surface 18 against the housing wall 25.1 under pretension of the spring element 50.

Accordingly, starting from the closed position, a dead center may first be traversed during an opening movement. When the control arm 1 is used with a piece of furniture 3 having a movable furniture part 2, for example a flap 2, the flap may thus be securely held on the piece of furniture 3 in a closed position.

The operation of the adjustment mechanism 90 is explained in more detail below with reference to FIG. 4.

By means of the adjustment mechanism 90, the preload of the spring element 50 may be adjusted. For this purpose, a tool 65 may, for example, be guided through a tool opening 27 of the housing 21 and engaged with the head 63 of the preloading element 60. The tool 65 may be a screwdriver or a screw bit with a cross-head contour, for example a Phillips screw drive. The cross-head contour may be engaged with an engagement structure 64 on the head 63 in such a way that an actuation, in particular a rotation of the tool 65 is translated into a rotation of the preloading element 60.

Rotation of the preloading element 60 causes the coupling body 70 to move relative to the preloading element 60 by rotating the threaded section 61 relative to the threaded receptacle 76. Unintentional rotation of the coupling body 70 may be prevented by providing that the coupling body 70 engages with its elevations 74 in recesses 84 of the spring bearing 80, the spring bearing 80 being mounted in a rotationally fixed and displaceable manner with respect to the second arm section 20, for example with respect to the housing 21. The guide surfaces 89.1 of the spring bearing 80 may bear on the housing wall 25.4 and the guide surfaces 89.2 bear on the counter-surface 25.10 of the housing 21.

Accordingly, when the coupling body 70 is displaced relative to the preloading element 60, the spring bearing 80 is also displaced relative to the preloading element 60, the preloading element 60 being supported relative to the second arm section 20, in this case relative to the receptacle 28.1 of the housing 21.

To increase the preload of the spring element 50, the preloading element 60 may now be rotated by means of the tool 65, starting from the state of minimum preload shown in FIG. 4, and the coupling body 70 and the spring bearing 80 are thus displaced relative to the preloading element 60. The direction of adjustment when increasing the preload is to the upper right in FIG. 4.

Now, when the increase in preloading is made to such an extent that the coupling element 70 exceeds the end of the threaded section 61, the threaded receptacle 76 of the coupling element 70 disengages from the threaded section 61. In the present case, an extension 62 is provided on the preloading element 60 adjacent to the threaded section 61.

The threaded receptacle 76 of the coupling body 70 may then rotate freely on the extension 62, which does not carry threads, but is held in its orientation by the extension 62 and is secured against loss. Further actuation of the preloading element 60 in the preloading direction no longer increases the preload of the spring element 50. However, starting from this position, the threaded receptacle 76 may be brought back into engagement with the threaded portion 61 of the preloading element 60 when the tool 65 is actuated in the opposite direction. Thus, the preload of the spring element 50 may be reduced.

If the preloading of the spring element 50 is now reduced to such an extent that the coupling body 70 comes into contact with the head 63 of the preloading element 60, the design of the coupling body 70 and the spring bearing 80 may prevent further actuation from damaging the adjusting mechanism 90 and/or the second arm section 20.

A further rotation of the preloading element 60 in the direction of the reduction of the preloading leads in the present case to a further rotation of the coupling body 70. The elevations 74 of the coupling body 70 may in this case be disengaged from the recesses 84 of the spring bearing 80. Consequently, there is a releasable connection in the circumferential direction of the threaded section 61 of the preloading element 60. The effects of excessively high operating forces introduced into the adjustment mechanism 90 via the tool 65 may also be effectively prevented in this way.

The invention claimed is:

1. A control arm for a movable furniture part of a piece of furniture, comprising:

- a first arm section and a second arm section pivotably connected to each other, one of the arm sections being configured to be coupled to the movable furniture part and the other of the arm sections being configured to be coupled to a fixed furniture part of the piece of furniture;
- a control piece coupled to the first arm section in an articulated manner, the control piece including a control surface:
- a thrust piece mounted on the second arm section and including a counter control surface in contact with the control surface;
- at least one spring element biasing the thrust piece relative to the control piece; and wherein when the first and second arm sections are pivoted relative to each other between a closed position and an open position a relative movement between the control piece and the thrust piece is a rolling movement.

2. The control arm of claim 1, wherein:

the arm section configured to be coupled to the piece of furniture includes a control arm bearing for pivotable coupling to the piece of furniture; and/or the arm section configured to be coupled to the movable furniture part includes a flap bearing for pivotable coupling to the movable furniture part.

3. The control arm of claim 1, wherein:

the control surface and/or the counter control surface is convexly curved at least in part.

4. The control arm of claim 1, wherein:

when the arm sections pivot relative to one another a position of an instant center of the relative movement between the control piece and the thrust piece shifts along the control surface and/or the counter control surface.

5. The control arm of claim 1, wherein:

the control surface of the control piece includes a toothing and the counter control surface of the thrust piece includes a counter toothing such that during the rolling movement between the control piece and the thrust piece the toothing engages with the counter toothing to form a positive-locking connection.

6. The control arm of claim 1, wherein:

in the closed position a force exerted by the at least one spring element on the thrust piece is lower than a maximum force exerted by the at least one spring element on the thrust piece during pivoting of the arm sections relative to each other.

7. The control arm of claim 1, wherein:

the control surface of the control piece and/or the counter control surface of the thrust piece include one or more detent positions.

8. The control arm of claim 1, wherein:

a line of force exerted by the thrust piece on the control piece and a line of force exerted by the first arm section on the control piece are substantially collinear.

9. The control arm of claim 1, wherein:

the second arm section includes two housing halves forming a housing including a receiving space.

10. The control arm of claim 9, wherein:

the housing includes at least one housing wall including a guide groove; and the control piece includes at least one guide projection guided in the at least one guide groove.

11. The control arm of claim 9, wherein:

the spring element is received in the receiving space of the housing and the spring element is supported in an end region of the housing.

12. The control arm of claim 9, wherein:

the housing includes at least one housing wall including a curved guide region; and the thrust piece includes at least one curved guide surface, the thrust piece being guided by the at least one curved guide surface engaging the at least one curved guide region.

13. The control arm of claim 1, wherein:

the first arm section includes a stop surface and a contact surface;

the control piece includes a stop and a counter contact surface;

in the open position the stop surface is supported relative to the stop; and in the closed position the contact surface is supported relative to the counter contact surface.

14. The control arm of claim 1, wherein:

the first arm section includes a control lever; and the control piece is coupled to the control lever in an articulated manner.

15. The control arm of claim 1, further comprising:

a spring bearing supporting the at least one spring element; and a preloading element cooperating with the spring bearing to form an adjusting mechanism, a position of the preloading element being adjustable relative to the spring bearing to adjust a preloading of the spring element.

* * * * *